United States Patent [19]

Ivanov et al.

[11] Patent Number: 5,420,747
[45] Date of Patent: May 30, 1995

[54] CAPACITOR WITH A DOUBLE ELECTRIC LAYER CELL STACK

[75] Inventors: Alexander M. Ivanov; Arkadiy Gerasimov; Vladimir A. Ilyin; Gennadiy I. Emelianov, all of Moscow, Russian Federation

[73] Assignee: Econd, Moscow, Russian Federation

[21] Appl. No.: 134,959

[22] Filed: Oct. 12, 1993

[30] Foreign Application Priority Data

Oct. 12, 1992 [SU] U.S.S.R. .................. 5065235

[51] Int. Cl.6 ............................................. H01G 9/00
[52] U.S. Cl. ...................................................... 361/502
[58] Field of Search ......................... 361/502; 29/25.03

[56] References Cited

U.S. PATENT DOCUMENTS

| | | | |
|---|---|---|---|
| 3,536,963 | 10/1970 | Boos | 361/502 |
| 3,652,902 | 3/1972 | Hart et al. | 361/502 |
| 4,313,084 | 1/1982 | Hosokawa et al. | 361/502 |
| 4,683,516 | 7/1987 | Miller | 361/502 |
| 5,077,634 | 12/1991 | Shirata et al. | 361/502 |
| 5,093,762 | 3/1992 | Sato et al. | 361/502 |

FOREIGN PATENT DOCUMENTS

| | | | |
|---|---|---|---|
| 58-140110 | 8/1983 | Japan . | |
| 01-101617 | 4/1989 | Japan | 29/25.03 |
| 2012521 | 7/1992 | WIPO | 361/502 |

Primary Examiner—Bruce A. Reynolds
Assistant Examiner—Michael D. Switzer
Attorney, Agent, or Firm—Vaden, Eickenroht, Thompson, Boulware & Feather

[57] ABSTRACT

This invention relates to a capacitor with cells of a double electric layer comprising of a case of dielectric material for accommodating a stack of capacitor cells having a double electric layer with electrolyte therein and having been compressed together in a stack, and further having at least two current collector plates connected to the stack of capacitor cells for collecting current, and; at least two current feeders connected to the at least two current collector plates for feeding current there through, at least two platens of dielectric material for insulation of said stack of capacitor cells and for providing impermeability to an electrolyte and are inert thereto, at least two strength plates having the stack of capacitor cells therebetween, and a flexible brace member connected between said at least two strength plates for retaining and holding said stack of capacitor cells in a compressed stack.

11 Claims, 2 Drawing Sheets

CAPACITOR WITH A DOUBLE ELECTRIC LAYER CELL STACK

SUMMARY OF THE INVENTION

The present invention relates to the construction of a large capacitor for accumulating electrical energy, utilizing an electrolyte in a double electric layer cell and then stacking the double electric layer cells and compressing them into a stack. These large capacitors are further constructed by having at least two current collector plates connected to the stack of capacitor cells for collecting current, then connecting at least two current feeders to the current collector plates for feeding current there through. At least two platens of a dielectric material are then provided for insulation of the capacitor stack and these platens are also impermeable and inert to electrolyte. Further, at least two strength plates are provided to participate in the compression of the stack and the holding of the compression after it is induced into the stack. These at least two strength plates work in combination with the flexible brace members connected between the at least two strength members for retaining and holding the stack of capacitor cells in a compressed stack. In yet other embodiments at least one layer of a fiber net of dielectric material is placed about the stack of capacitor cells to embrace the stack when the fiber net of dielectric material is connected between the at least two strength plates and the at least two collector plates. In yet other embodiments, multiple fiber nets may be connected between the at least two strength plates, the at least two current feeders and/or any combination thereof based on the design needs and configuration for the capacitor of this invention. A case is formed around the stack.

BACKGROUND OF THE ART

The construction of a capacitor from cells providing for a method of accumulating electric energy in an electric double layer on the surface of contact of an electrode and with an electrolyte therein is disclosed in many patents including U.S. Pat. No. 3,536,963. In this patent, the electrodes are comprised of particles of activated carbon having a great surface area and are impregnated with an electrolyte of either aqueous and/or non-aqueous nature. To collect a charge on the external side of the electrodes, current collectors are provided. The current collectors are made of a conducting thin-sheet of material that is impermeable to the electrolyte and is inert to it. The electrodes are held to their original shape by means of elastic gaskets around the outside perimeter. The elastic gaskets seal the electrodes from the environmental effects and further provide the electrical insulation from the side current collectors around the perimeter of the capacitor.

It should be understood that while the capacitors of the above patent are low voltage systems which possess a large capacitance created from the electric double layer, they are nevertheless limited by the decomposition voltage of the electrolyte. Therefore to get an increased operating voltage, it has become known in the art to stack these electric double layer capacitors or cells in a stack which has each cell connected in a series. The number of cells in the stack thus being determined by the required operating voltage needed and the operating limits of the collective cells. To obtain the current from these stacks, these stacks are provided with wire current lead outs and are mounted in a compartment type case of a dielectric material like polymethylmethacrilate with holes provided for said current lead outs to deliver the current wherever it is desired.

The problems with these type constructions is that the cells having a liquid electrolyte leak and form electrolyte jumpers between the adjacent cells which results in an increased leakage of current and the formation of gases subsequent of electrolysis of the electrolyte.

Further, these cells when placed in the stack are compressed initially, but over their life there is a decrease in the initial compression of the capacitor cells which increase the contact resistance factor in the cells and the overall stack.

Other patents like the electric double layer capacitor in Japanese lay open application 58-140110 attempt to solve these problems by forming a stack of capacitor cells with an electric double layer cell and current collector plates with current lead outs which are stacked and then compressed by a given force. In this formation process, the inner layer of the dielectric case closely embraces the stack of capacitor cells and the connected current collector plates, which factor prevents electrolyte short circuits between the cells and simultaneously makes for maintaining a compressive force necessary for providing the electrical contacts in the stack. Thus, the second dielectric layer of the case forms an external shell about the stack but still did not solve the compression decay life problem associated with compressed stacks of double electric layer capacitors.

The prior art has attempted in other prior art solutions to solve the compression decay problems by making electric double layer capacitors of a relatively small area as in up to 10 $cm^2$ and using a low operating voltage by using a small number of capacitor cells in the stack which stored little energy as in up to 100 Joules and having a low discharge pulse power of up to 100 Watts, but with only limited success. Further, the prior art has also had little luck in the formation of large energy capacitors that have up to 100 $cm^2$ of surface area and a great many of such capacitor cells as in 10 to 100 in the stack without the formation of cracks and loss of efficiency. These failures are in some cases caused by the large lateral surface over which changes in temperature have great effects. The mechanical effects of expansion can cause the dielectric case to crack and leak electrolyte which reduces the service life and operating safety of the device. Also the insulating cases are not really designed to maintain a great compression force of the stack in such large capacitors which can reach several tons of compression force. Using the current prior art cases with in the capacitors with these large forces makes the capacitor subject to loss of compression and accordingly increase in internal resistance of the capacitor.

DISCLOSURE OF INVENTION

It is an object of this invention to create a double electric layer capacitor which has an improved case which would prolong service life and enhance the safety of operation especially in the large size capacitors where service life and safety can be very important.

It is also an object of this invention to create a double electric layer capacitor having a stabilized internal resistance.

Yet another object of this invention is to provide a means to compress the double electric layer of cells of the capacitor of this invention and to provide a way to hold this compression force and yet allow adjustments for the factor which cause expansion and contraction in these stacks.

Still a further object of this invention is to create a capacitor which uses large area of double electric layer cells in the capacitor and which cells are not subject to cracking or leaking of electrolyte.

Also an object of this invention is to provide a capacitor which can use many double electric layer cells in the capacitor structure for storage of large amounts of energy in the capacitor structure for storage of large amounts of energy in the capacitor.

It is yet a further object of this invention to provide a structure of the stacked double electric cell layers which can be used in the stack compression process and also be used in the retention of the compression forces over the life of the capacitor and cell stack after its formation.

It is an object of this invention to build a capacitor which is very large to provide maximum storage of energy, but which is very light relative to its rapid and large energy output.

Yet another object of this invention is to provide all strength enhancements in the axial direction of the stack of the double electric layer cells and to provide relative flexibility in other directions.

It is a further object of this invention to manufacture an electrode which does not require special design elements to hold its shape or form.

Also an object of this invention is to have a capacitor formed which produces consistent results each time it is formed.

Yet further objects and advantages of this invention will be more fully understood from the detailed specifications and drawings.

IN THE DRAWINGS

SPECIFICATIONS

Figure 1:
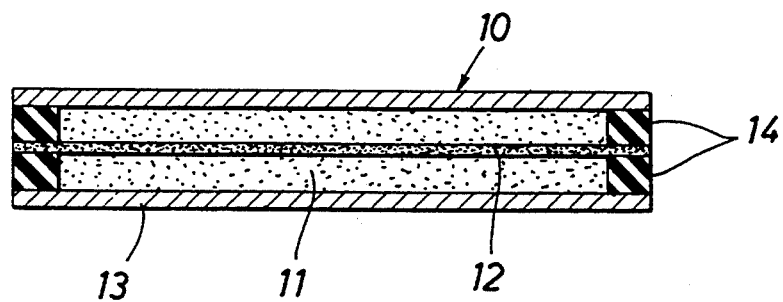
FIG. 1 is a cross sectional view of a general type of electric double layer capacitor cell which might be used in the formation of the capacitor of this invention.

Referring generally to the drawings of this invention, wherein FIG. 1 a general double electric electrode or cell 10 is shown. These cells are formed from particles of activated carbon 11 having a great surface area due to the porous nature of the activated carbon 11. These particles are separated by an ion-carrying porous separator 12. The cell or double electric electrode of activated carbon 11 and the separator 12 are impregnated with the electrolytes of either aqueous and/or non-aqueous electrolytes. To collect a charge on the external side of the electrodes provision is made for current collectors 13 of a conducting thin sheet material that is impermeable to the electrolyte and inert thereto to be laid against the activated carbon 11. To maintain the form of these double electric electrodes or cells 10 and to prevent them from being exposed to the environment and to provide the electrical insulation from side current collectors around the perimeter of the cell, an elastic gasket 14 is provided as shown at least in some prior art capacitors.

However it will be understood by those skilled in the art that a single cell or one double electric electrode is a low voltage system whose working voltage is limited by the decomposition voltage of the electrolyte. To increase this voltage it has been discovered that collecting these capacitor 10 into a serial stack 15 gives improved output and storage capacity. Also it has been determined that their performance is greatly improved by compression of the stacks 15 but the compression must be held in the finished capacitor stack 15.

Figure 2:
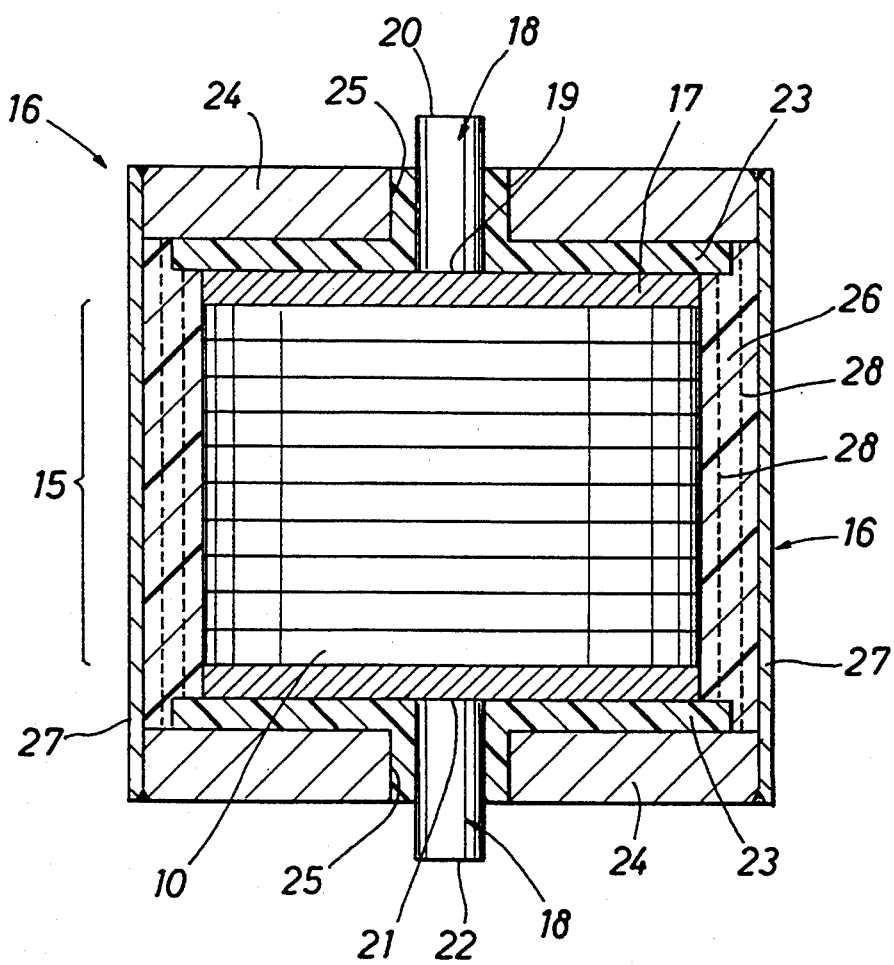
FIG. 2 is a diagrammatic section view of a capacitor formed by this invention.

In one embodiment of this invention shown in FIG. 2, it can be seen how these cells 10 can be arranged to form a serial stack 15 for providing an increased storage capacity and power output of a capacitor 16. However, just forming a stack 15 does not give the improvements of this invention and it will be seen from FIG. 2 that other elements in combination are necessary to achieve the novel and synergistic effects of this invention.

Referring again to FIG. 2, the capacitor 16 of this invention also has provided at least two current collector plates 17 connected to the stack 15 of the double electric electrode or cells 10. These two current collector plates 17 are for collecting current from the serial stack 15 or for imputing current therein when storing current. While this FIG. 2 only shows one pair of current collector plates 17, it will be understood by those skilled in the art that the capacitor could be made with any number of cells 10 and at least two current collector plates 17 depending on the desired design and operating requirements.

Further, connected to the at least two current collector plates 17 are at least two current feeder members 18 for feeding the current out of the stack 15 on discharge and for feeding the current into the stack 15 on its being charged. One of the at least two current feeder members 18 has one part 19 connected to one of the at least two current collector plates 17 and the other part 20 open to the environment for allowing of the attachment of the capacitor 17 for use. The other of the at least two current feeder members 18 also has the one part 21 connected to one of the at least two current collector plates 17 and the other part 22 open to the environment also for allowing of the attachment of the capacitor 17 for use.

Figure 3:
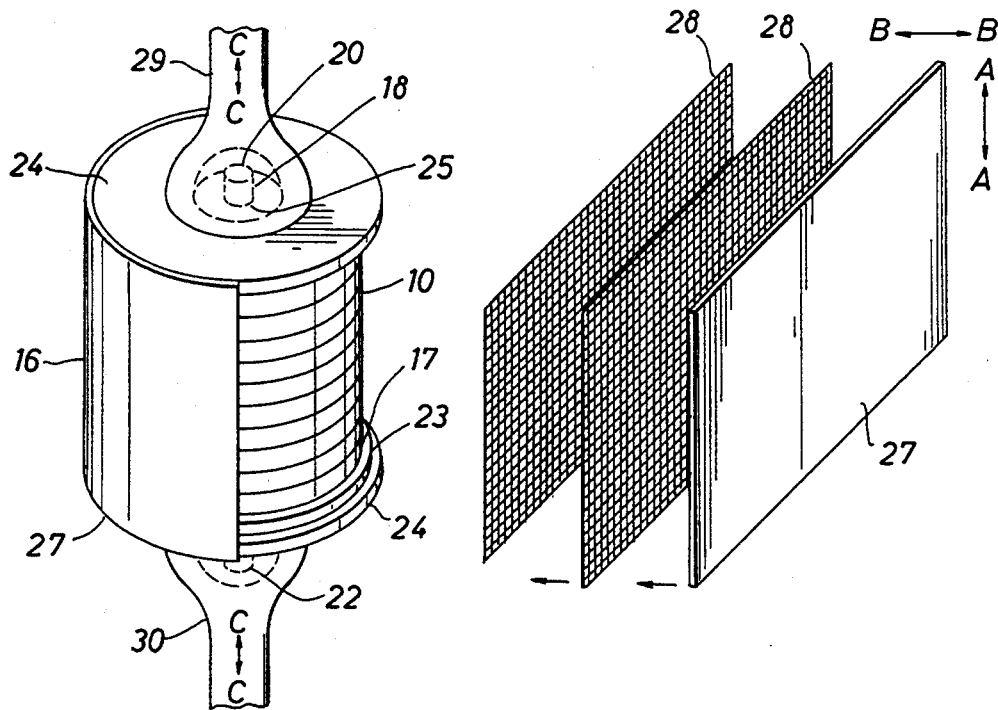
FIG. 3 is an exploded view of the elements of this invention and their assembly while the stack is under pressure from a pressure source with sheet material for flexible brace members.

As shown in the embodiment of FIG. 3 the at least two current feeders members 18 are located in central and axial positions at their point of connection with the at least two current collector plates 17 but as those skilled in the art will understand they could be located in any location which would put them in contact with the at least two current collector plates 17 and have a portion thereof open to the outside of the capacitor 16 to still achieve the results of this invention.

To prevent the at least two current feeder members 18 from grounding out and to seal the internal parts of the capacitor 17 from the environment and the environment from the internal part of the capacitor 16 at least two platens 23 are provided. These at least two platens 23 must be impermeable to an electrolyte and also inert to it. The at least two platens 23 are positioned about the at least two current feeders member 18 and over the surface for the at least two current collectors 17 but not so as to interfere with the connection of the at least two current collectors 17 but not so as to interfere with the connection of the at least two current collectors 17 and the at least two current feeders 18 connections at their respective one parts 19 and 21 through which current must be allowed to flow.

Positioned onto the at least two platens 23 are at least two strength plates 24. These at least two strength plates 24 in at least one embodiment have an aperture 25 provided at the center of the at least two strength plates 24 for allowing the at least two current feeders 18 there through to the outside of the capacitor 16. Also this aperture 25 has some portion of the at least two platens 23 therein to insulate the other parts 20 and 21 of the at least two current feeders 18 from contact with the at least strength plates 24. It will also be appreciated by those skilled in the art that the at least two strength plates 24 when pressed down on the at least two platens 23 will aid in the sealing of the capacitor 16.

In regard to pressing down on the at least two strength plates 24, they are axially centered on the stack 15 and when pressure is applied to the at least two strength plates 24 the compression forces are delivered through the capacitor 16 for compression of all the elements thereof.

In these at least two strength plates 24, as shown in FIG. 3, are designed to be of such strength as to deliver 0.5 to 15.0 tons of pressure to the stack 15 and thereby compress the stack 15 the at least two current collectors 17 and the at least two platens 23 when compression forces of such a quantity are applied. These forces are shown applied in FIGS. 3 and 4 as a diagrammatical representation with the upper compression piston 29 and lower compression piston 30 in place on the strength plates 24. The direction of the force is shown by arrows C—C in both the upper and lower compression pistons 29 and 30. It will be readily apparent however that if these forces are applied and then withdrawn that the full compression force delivered on all the above described elements will not remain in its full force but will be dissipated.

As those skilled in the art will recognize, when using such large forces to compress the above described elements the decompression force from such elements is also very great in the opposite direction. Thus using the conventional casing material of the prior art which used in smaller capacitors will fail or crack if not immediately they experience a short service life because of these large forces. Further, in large sizes the forces involved are even greater and it is very difficult to maintain these forces of compression on the stack 15. In this invention a dielectric reinforced case 26 is formed about the stack 15, the at least two current collector plates 17 connected to the at least two current feeders 18 and positioned between the at least two strength plates 24. The at least two strength plates 24 are then interconnected by flexible brace member or members 27.

The reinforced case 26 is made of dielectric reinforced material which maintains its mechanical strength and retains its integrity when exposed to the effects of temperature variations, shocks, jolting, etc., which significantly increases service life of a capacitor with electric double layers or stacks 15.

In addition to just the general reinforcing of the case 26, the fibers of the dielectric may be oriented fibers of dielectric which makes it possible to considerably increase the strength of the dielectric case in general. In certain applications the primary strength orientation should be in the axial direction as this is the primary force in action of the stack 15 after the stack 15 is removed from compression.

Also with the strength plates 24 interconnected with the flexible braces 27 and with the stack 15 sandwiched therebetween the required compression forces may be maintained in the capacitor 16 to achieve superior performance and service life. Further with the stiffness of the at least two strength plates 24, it insures a uniform force of compression over the entire surface of a capacitor stack 15 when being compressed.

Also those skilled in the prior art may appreciate the flexible braces member or members 27 are very flexible in the trans-axial direction B—B and flexible in the axial direction A—A prior to attachment and decompression of the stack 15 but after attachment of the flexible brace member 27 between the at least two strength plates 24. When the stack is released from the external pressure they are less flexible in the A—A direction and provide the holding power to maintain the compression in a stack 15. However the flexible brace members 27 are still flexible in the axial direction to the extent of thermal changes which also affect the stack 15 in a similar way, therefore the flexible brace members 27 adjust in tandem with thermal changes in the stack 15 to maintain the compression force. The fact that the decompression forces run in the opposite direction to the compression forces mean that the A—A forces in the flexible brace members 27 on attached provides great holding power while maintaining some flexibility still in the B—B direction to accommodate future movement with out failure of the stack 15.

The reason compression force is important is that when there is maximum contact between the cells 10 and their internal parts the internal resistance goes down so that there is maximum current flow.

Figure 4:
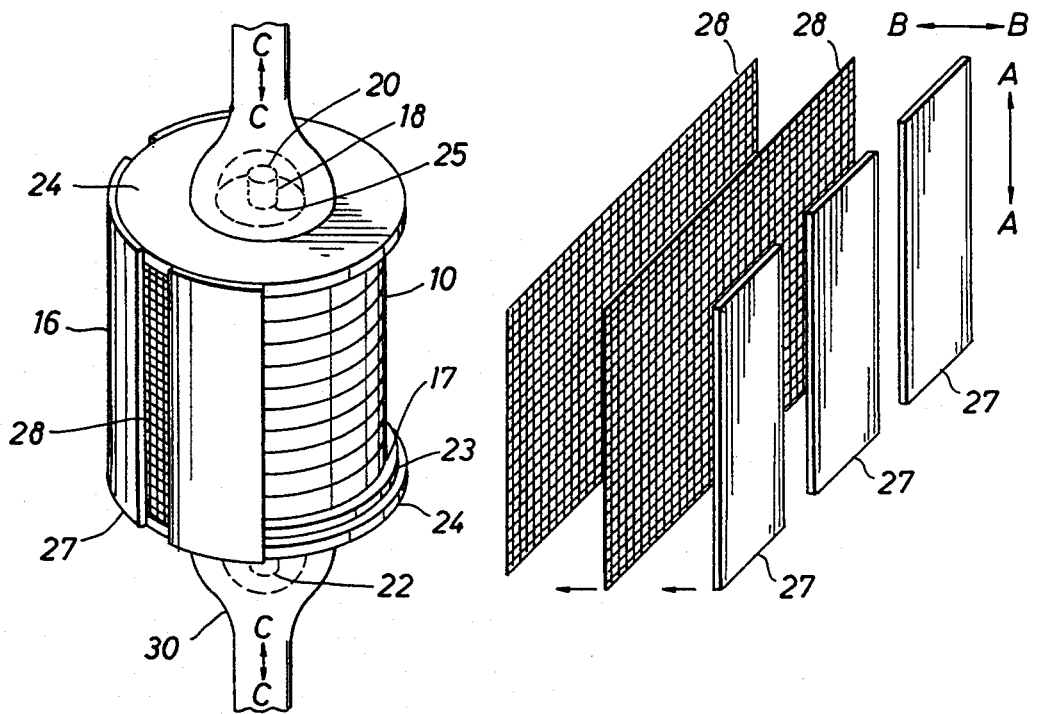
FIG. 4 is another exploded view of the elements of this invention and their assembly while the stack is under pressure from a pressure source with strips used for flexible brace members.

In the embodiments of FIG. 2, 3 and 4, at least one layer of a net fiber 28 of dielectric material is provided about the stack 15. In a preferred embodiment at least one layer of a net fiber 28 would be used to encompass a stack 15 which in addition increases the strength of the reinforced dielectric case 26 and also aids in the ease of moving and placing same. Obviously to those skilled in the art the number of net fiber layers 28 used is predetermined by the volume of the case and the energy level of a given capacitor 16.

In at least some embodiments the dielectric fiber net 28 is place about the stack 15 and is connected between the at least two strength plates 24 for embracing the stack 15 and providing also some holding thereof.

In yet other embodiments the dielectric fiber net 28 is placed about the stack 15 and is connected between the at least two current collector plates 17 for embracing the stack 15 and providing also some holding thereof.

While in yet other embodiments the at least two dielectric fiber nets 28 are placed about the stack 15 and are attached between both the at least two strength plates 24 and the at least two current collectors 17 for embracing the stack 15 and providing also some holding thereof.

The size of the dielectric fiber for the net fibers 28 and reinforcing fiber for the case should be of such size in the axial direction to provide sufficient strength and yet not so large as to interfere with its application. It has been found that in some applications a range of fiber sizes for the at least one layer of the fiber net 28 is from 0.10 mm to 10.0 mm. In yet other application a fiber size of from 0.10 mm to 2.0 mm would provide sufficient size and strength. Further, net fibers 28 having less than 0.10 mm do not provide a sufficient strength of dielectric material for the case and that those having a diameter of over 2.00 mm deteriorate the mechanical properties of the case material.

In most embodiments it is preferred that the dielectric fiber of the net fibers 28 also have a high adhesion to the dielectric material of the case such that a bonding may occur.

To aid in the case formation of the dielectric fiber for the net fibers 28 must also have a mesh size which is not too large or too small. It has been found that using the current case materials that mesh sizes of dielectric fiber nets 28 having an open space of less than 0.10 mm does not assure a reliable penetration there through of the dielectric material of the case in its process of formation. Further it has been found that mesh sizes of dielectric fiber nets 28 having a size greater than 10.0 mm does not prevent formation of cracks in the dielectric material of the case.

Those skilled in the art will realize that the flexible brace member 27 can be formed in many different ways without departing from the concept of this invention. For example, in FIG. 4 the flexible brace member 27 is formed from sheet strips which are connected with the at least two strength plates at various location around the body of the stack 15. Further in FIG. 3, it can be seen that a complete sheet of material may be connected with the at least two strength plates around the body of the stack 15. Any configuration which would have the flexibility herein described and can be attached as herein described to hold the compression forces induced into the stack 15 may be used as a flexible brace member 27.

The flexible brace member 27 and the dielectric fiber of the net fibers 28 may be attached in any conventional way depending on the material being attached but clearly welding and gluing of these type elements are acceptable and well known in the art.

A general method of forming the capacitor of this invention will aid those skilled in the art on how to make and use.

Other modes of applying the principle of this invention may be employed instead for those specifically set forth above changes being made a regards the details herein disclosed provided the elements set forth in any of the following claims or the equivalent of such be employed.

It is therefore particularly pointed out and distinctly claimed as the invention.

We claim:

1. A capacitor with a double electric layer comprising
    (a) a stack of capacitor cells having a double electric layer with electrolyte therein and compressed together in said stack;
    (b) at least two current collector plates connected to said stack of capacitor cells for collecting current;
    (c) at least two current feeders connected to said at least two current collector plates for feeding current therethrough;
    (d) at least two platens of dielectric material for insulation of said stack of capacitor cells and for providing impermeability to an electrolyte and being inert thereto;
    (e) a case of dielectric material formed for accommodating said stack of at least two current collector plates, at least two current feeders, and at least two platens;
    (f) at least one layer of fiber net means of dielectric material connected about said stack of capacitor cells for embracing said stack of capacitor cells and having a high adhesion to the dielectric material of said case;
    (g) at least two strength plates for receiving compression for said stack of at least two current collector plates, at least two current feeders, and at least two platens therebetween; and
    (h) flexible brace means connected between said at least two strength plates for retaining and embracing said stack of capacitor cells in a compressed stack.

2. A capacitor with a double electric layer as in claim 1 wherein said at least one layer of a fiber net of dielectric material means is oriented with its primary strength in an axial direction with said stack of capacitor cells.

3. A capacitor with a double electric layer as in claim 2 further comprising an at least one layer of a fiber net of dielectric material means about said stack of capacitor cells and connected between said at least two strength plates for embracing said stack of capacitor cells.

4. A capacitor with a double electric layer as in claim 3 further comprising an at least one layer of a fiber net of dielectric material means about said stack of capacitor cells and connected between said at least two current collector plates for embracing said stack of capacitor cells.

5. A capacitor with a double electric layer as in claim 4 wherein said case is further comprised by a reinforced plastic.

6. A capacitor with a double electric layer as in claim 5 wherein said case of reinforced plastic further comprises oriented fibers of dielectric material.

7. A capacitor with a double electric layer as in claim 6 wherein said oriented fibers of dielectric material are oriented in an axial direction.

8. A capacitor with a double electric layer as in claim 7 wherein said at least one layer of a fiber net of dielectric material means has said fiber net of dielectric material means arranged for providing openings therebetween within a range of from 0.1 mm up to 10 mm.

9. A capacitor with a double electric layer as in claim 8 wherein said at least one layer of a fiber net of dielectric material means comprises fibers having diameters within a range of 0.1 mm to 2.0 mm.

10. A capacitor with a double electric layer as in claim 9 wherein said at least one layer of a fiber net of dielectric material means has an adhesion to the dielectric material of said case.

11. A capacitor with a double electric layer as in claim 10 wherein at least two strength plates have an aperture there through at their centers for allowing respectively one and the other of said current feeders there through and for providing the remaining surface for receiving compression for said stack of capacitor cells there between at pressure from 0.5 tons to 15 tons through said strength plates to said stack of capacitor cells.

* * * * *